United States Patent [19]

Miller et al.

[11] Patent Number: 5,016,391

[45] Date of Patent: May 21, 1991

[54] DOOR AND DOCK COVER

[75] Inventors: Paul Miller; Tommy L. Thompson, both of Waverly, Iowa

[73] Assignee: Energy Concepts, Inc., Waverly, Iowa

[21] Appl. No.: 555,309

[22] Filed: Jul. 20, 1990

[51] Int. Cl.⁵ .............................................. E06B 7/00
[52] U.S. Cl. .................................... 49/70; 52/64; 52/173 R; 52/173 DS; 160/127
[58] Field of Search .......... 49/70; 52/173 R, 173 DS, 52/64, 202; 160/127

[56] References Cited

U.S. PATENT DOCUMENTS

| | | | |
|---|---|---|---|
| 3,378,950 | 4/1968 | Butler et al. | 49/70 |
| 3,528,086 | 9/1970 | Conger | 135/5 |
| 3,914,911 | 10/1975 | Paasch | 52/180 |
| 4,010,571 | 3/1977 | McGuire et al. | 49/70 |
| 4,221,091 | 9/1980 | Ganse et al. | 52/202 |
| 4,381,631 | 5/1983 | Frommelt | 52/173 |
| 4,423,574 | 1/1984 | Pierre | 52/202 |

Primary Examiner—Philip C. Kannan
Attorney, Agent, or Firm—Zarley, McKee, Thomte, Voorhees, & Sease

[57] ABSTRACT

An insulated dock plate cover is provided which is connected to the door and thus moves automatically to raised and lowered positions as the door is opened and closed. The forward end of the dock plate cover is connected directly to the lower end of the door while the rear end of the cover is connected by cables which are operatively connected to the conventional door cables in turn connected to a motorized overhead drive shaft.

10 Claims, 2 Drawing Sheets

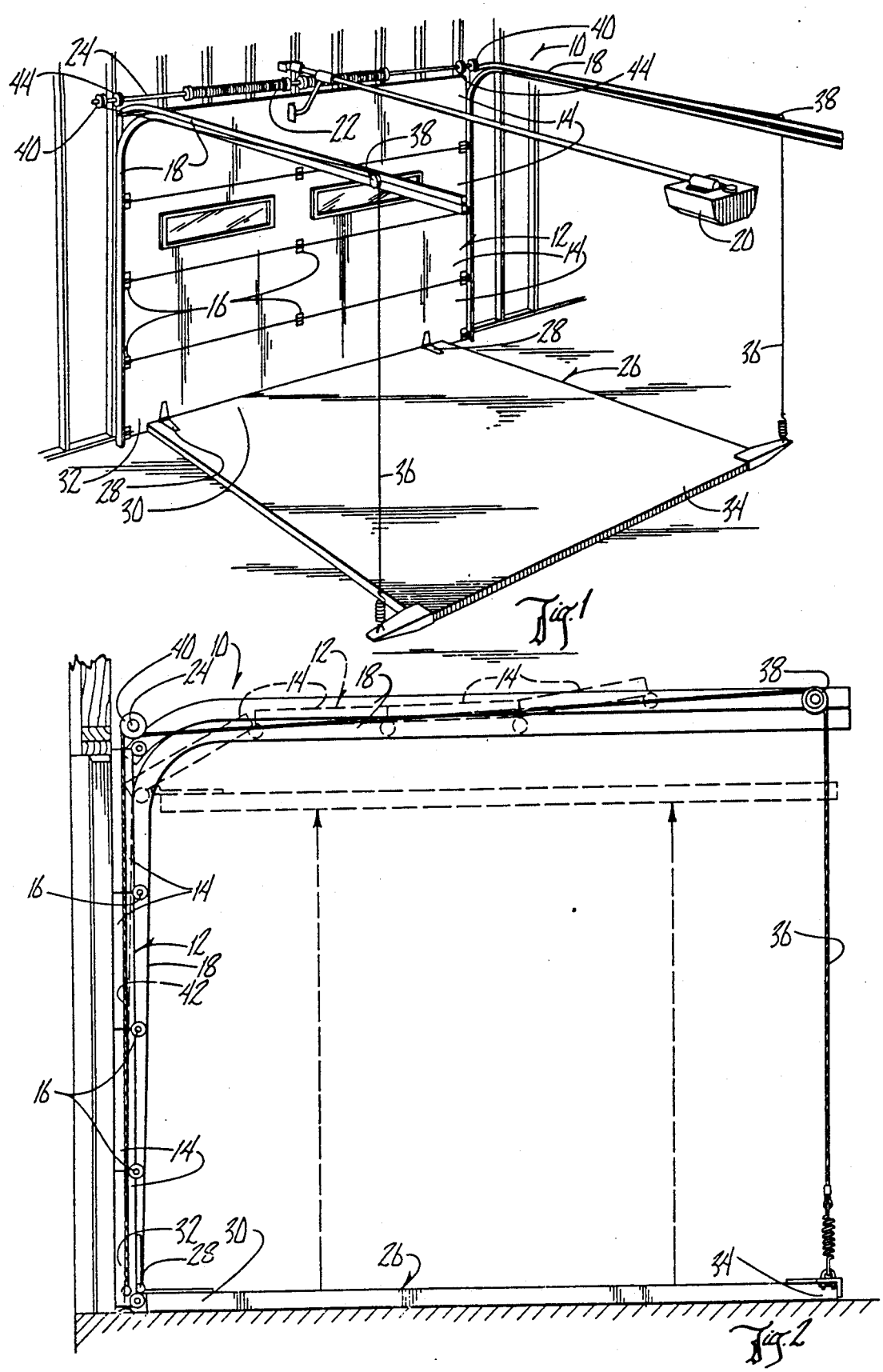

DOOR AND DOCK COVER

BACKGROUND OF THE INVENTION

Commercial and industrial buildings have loading docks that utilize metal dock covers which are pivotal to match the floor of the building up with the floor of the truck. There is space under the covers which is open to the outside allowing substantial heat loss in the winter from with inside the building through the metal dock cover. A cover could be placed over the metal dock plate, but it would be an inconvenience to install and remove it on the occasion of each use. What is needed is a dock plate cover that is automatically removed when the dock is to be used and reinstalled after completion of the use.

SUMMARY OF THE INVENTION

An insulated dock plate cover has been provided which is attached to the door and automatically moved with the door between raised and lowered positions. The cover pivotally connects to the lower end of the door and is supported at its opposite end by cables that are operatively connected to the door. The cover will work with doors which are one piece and raised vertically or are multi-sectioned and move vertically and horizontally. When used with the multi-sectioned door the insulated dock cover is parallel to the door when in the raised position all the while remaining parallel to the floor.

DESCRIPTION OF THE DRAWINGS

FIG. 1 is a perspective view of the combination door and insulated

FIG. 2 is a side elevation view thereof.

DESCRIPTION OF THE PREFERRED EMBODIMENT

Figure 3:
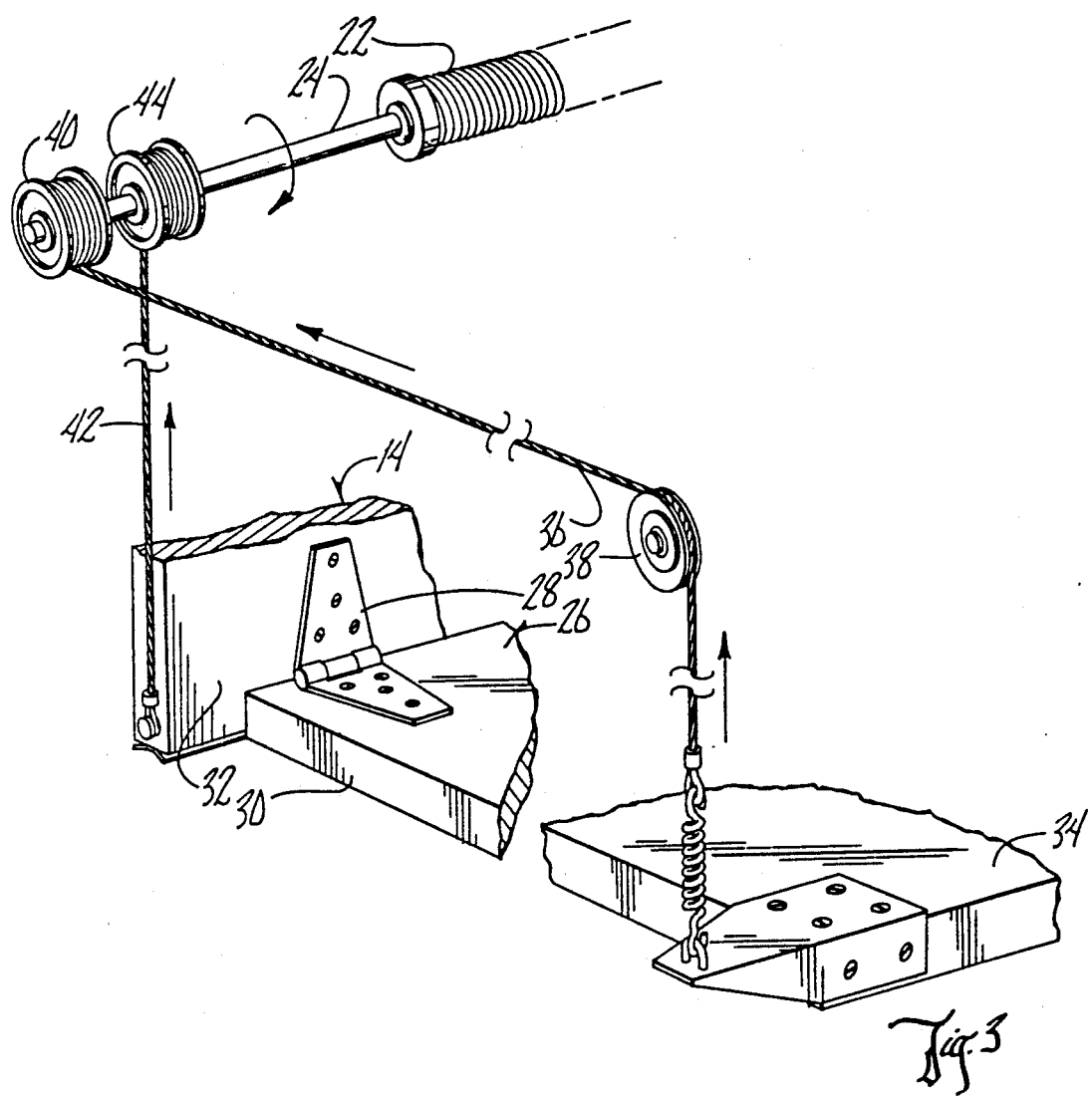
FIG. 3 is a fragmentary perspective view of the cable and hinge connection of the insulated dock cover to the door.

The combination door and insulated dock cover of this invention is referred to in FIG. 1 generally by the reference numeral 10. It is seen that a conventional door 12 is utilized comprising multiple sections 14 connected together by hinges 16. Guide tracks 18 are provided on opposite sides for moving the door between opened and closed positions wherein the door is vertically disposed when closed and horizontally positioned when open as seen in FIG. 2. A motorized door opener 20 with a conventional assist spring 22 mounted on a shaft 24 are provided.

An insulated dock cover 26 is pivotally connected by hinges 28 at its forward end 30 to the lower end 32 of the door 12. The rear end 34 of the dock cover 26 includes cables 36 which extend vertically to pulleys 38 mounted on the guide track 18 and thence forwardly over a pulley 40 on the shaft 24. The door assembly includes a cable 42 connected to the door and to the shaft 24 through a pulley 44. Thus it is seen that in operation the insulated dock cover 26 will move together as a unit with the door 12 as it is raised and lowered. Accordingly, when the door is closed the dock plate cover 26 is in place providing the insulation desired to prevent heat loss from within the building to the outside through the metal dock plate (not shown). When a truck is to be unloaded and the door 12 is opened, it is necessary to remove the insulated dock plate cover 26 and this is accomplished automatically with the opening of the door 12. The cover 26 remains parallel to the floor throughout the entire operation whether the door is a multi-sectioned door, as shown, or a one-piece door which moves only vertically.

We claim:

1. A door and dock cover comprising,
   a door having upper and lower ends adapted to move vertically between raised and lowered positions to open and close a wall opening, and
   a horizontally disposed dock cover extending perpendicular to said door, said dock cover being connected to the lower end of said door for vertical movement between raised and lowered positions with said door and adapted to cover a dock when in said lowered position and be in a raised position above a dock when in said raised position.

2. The structure of claim 1 wherein said dock cover and door have widths substantially equal.

3. The structure of claim 1 wherein cable means are provided extending from the end of said cover opposite said door and operatively to said door for supporting said cover when being raised and lowered.

4. The structure of claim 3 wherein said cable means is further defined as extending from said cover vertically to pulley means adapted to be positioned above said cover.

5. The structure of claim 4 wherein said cable means extend from said pulley means to a second pulley means connected to a power means which has a second cable means connected to said doors for raising said door and cover together.

6. A building with a door and a dock comprising,
   a wall having an opening and a door in said opening moveable vertically between raised and lowered positions,
   a dock cover having forward and rearward ends with said forward end being connected to said door at its lower end, and
   power means for raising and lowering said door and dock cover together.

7. The structure of claim 6 wherein said power means includes cable means connected to said door.

8. The structure of claim 7 wherein said cable means includes a first pulley means adjacent said door's upper end and second pulley means substantially directly above the rear end of said cover and substantially in a horizontal plane at the top of said opening, a cable extends from the rearward end of said cover upwardly over said second pulley means thence forwardly to said first pulley means whereby said forward and rearward ends of said cover are supported and maintained in a common horizontal plane while being moved between raised and lowered positions.

9. The structure of claim 8 wherein said door includes guide means for moving said door from said closed vertical position to a raised horizontal position.

10. The structure of claim 9 wherein said guide means includes track means having a vertical section in the substantial plane of said opening and a horizontal section connected to said vertical section at the top of said opening and extending rearwardly over said cover whereby said door follows said track when being moved between lowered and raised positions.

* * * * *